US008572010B1

(12) United States Patent
Francis

(10) Patent No.: US 8,572,010 B1
(45) Date of Patent: Oct. 29, 2013

(54) DECIDING WHETHER A RECEIVED SIGNAL IS A SIGNAL OF INTEREST

(75) Inventor: James Covosso Francis, Honeoye Falls, NY (US)

(73) Assignee: L-3 Services, Inc., San Diego, CA (US)

( * ) Notice: Subject to any disclaimer, the term of this patent is extended or adjusted under 35 U.S.C. 154(b) by 191 days.

(21) Appl. No.: 13/221,397

(22) Filed: Aug. 30, 2011

(51) Int. Cl.
*G06F 15/18* (2006.01)
*G06N 99/00* (2010.01)

(52) U.S. Cl.
CPC .................................. *G06N 99/005* (2013.01)
USPC .......................................................... 706/12

(58) Field of Classification Search
USPC .......................................................... 706/12
See application file for complete search history.

(56) References Cited

U.S. PATENT DOCUMENTS

| | | | | |
|---|---|---|---|---|
| 6,161,209 A * | 12/2000 | Moher | ........................... | 714/780 |
| 6,853,328 B1 * | 2/2005 | Guice et al. | ...................... | 342/54 |
| 6,983,264 B2 * | 1/2006 | Shimizu | ........................... | 706/22 |
| 6,985,749 B2 * | 1/2006 | Bannasch et al. | ............. | 455/506 |
| 7,149,320 B2 * | 12/2006 | Haykin et al. | ................ | 381/320 |
| 7,430,254 B1 * | 9/2008 | Anderson | ...................... | 375/342 |
| 7,437,166 B2 * | 10/2008 | Osseiran et al. | ........... | 455/452.1 |
| 7,567,635 B2 * | 7/2009 | Scheim et al. | ................ | 375/341 |
| 7,590,530 B2 * | 9/2009 | Zhao et al. | ...................... | 704/226 |
| 7,707,131 B2 * | 4/2010 | Chickering et al. | ............ | 706/45 |
| 2006/0192850 A1* | 8/2006 | Verhaegh et al. | .......... | 348/14.12 |
| 2008/0301077 A1* | 12/2008 | Fung et al. | ....................... | 706/46 |
| 2009/0088089 A1* | 4/2009 | Chandra et al. | ............... | 455/101 |

OTHER PUBLICATIONS

Roy E. Bethel, "Joint Detection and Estimation in a Multiple Signal Array Processing Environment", PhD Thesis, George Mason University, 2002.*

Satish Giridhar Iyengar, "Decision-Making with Heterogeneous Sensors—A Copula Based Approach", PhD Thesis, Syracuse University, Jan. 1, 2011.*

* cited by examiner

*Primary Examiner* — Kakali Chaki
*Assistant Examiner* — Fuming Wu
(74) *Attorney, Agent, or Firm* — Edward W. Callan

(57) ABSTRACT

A method of deciding whether an observed received signal is a particular signal of interest (SOI) includes the steps of: providing a statistical model of the particular signal of interest and a statistical model of the environment when the particular signal of interest is not present, and processing the observed received signal in accordance with a decision rule that uses the provided statistical models to decide whether the observed received signal is the particular signal of interest. The decision rule is:

$$\text{decision} = \begin{cases} SOI & \text{if } LLR(y) > +\lambda \\ \sim SOI & \text{if } LLR(y) < -\lambda \\ \text{unsure} & \text{otherwise} \end{cases}$$

where $$LLR(y) = \log \frac{P(a_1(y) \cdot a_2(y), \ldots \mid SOI)}{P(a_1(y) \cdot a_2(y) \ldots \mid \sim SOI)},$$

where LLR is log likelihood ratio, P denotes a probability, $a_1(y)$ and $a_2(y)$ are functions of first and second attributes of the observed signal y in a sequential order that said attribute functions are presented for computation of LLR(y), and $+\lambda$ and $-\lambda$ are real numbers,
wherein the statistical model of the particular signal of interest includes functions of attributes that individually have a probability distribution function $f_1$ when the observed received signal is the particular signal of interest such that $KL(f_1, f_0) > 0$, where $f_0$ is a probability distribution function of the respective individual attribute when the observed received signal is not a signal of interest.

10 Claims, 5 Drawing Sheets

CONSTRUCT A STATISTICAL MODEL FOR THE UNION OF A PARTICULAR SET OF OBSERVED SIGNALS AND OTHER OBSERVED SIGNALS BY USING FUNCTIONS OF ATTRIBUTES ASSOCIATED WITH SELECTED CRITERIA FOR DISTINGUISHING THE PARTICULAR SET OF OBSERVED SIGNALS FROM THE OTHER OBSERVED SIGNALS.
56
FIG. 7
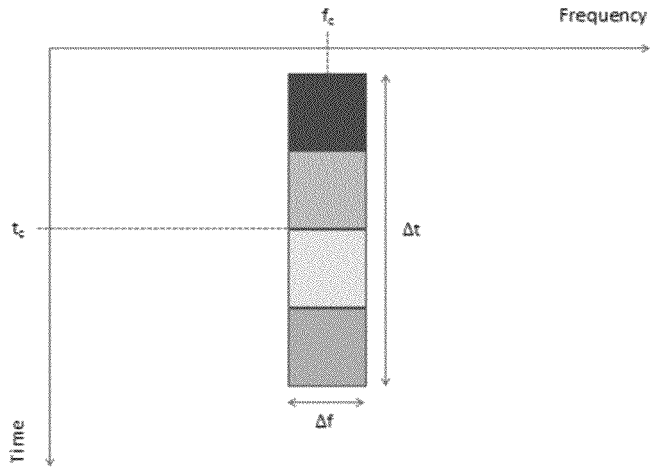
FIG. 8
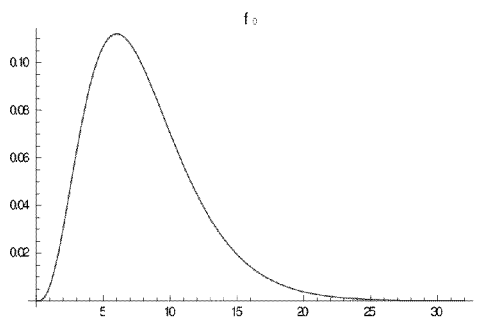
FIG. 9A
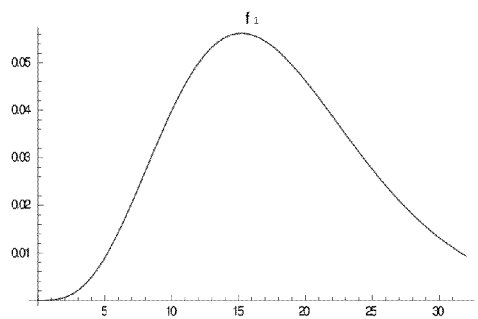
FIG. 9B

DECIDING WHETHER A RECEIVED SIGNAL IS A SIGNAL OF INTEREST

BACKGROUND OF THE INVENTION

The present invention generally pertains to signal communications and is particularly directed to deciding whether an observed received signal, such as a radio communication signal, is a signal of interest (SOI).

Various different attributes of an observed received signal may be processed to decide whether the observed received signal is a signal of interest.

The resources that may be used for making such a decision pertain to data processing and computing, receiver gain, the frequency to which the receiver is tuned and the timing of when the receiver is being tuned to a particular frequency. In some circumstances the time constraints for making such a decision are such that there is a need to optimize the use of such resources while maintaining the probability of accurately making the decision.

When one or more of these resources is limited, it may not be practical to continuously observe the full spectrum of interest; and it may not be practical to continuously process all of the various different attributes of the observed received signal that are typically processed in order to decide whether the observed received signal is a signal of interest. When a network of sensors (such as antenna elements) for observing attributes of the received signal is used, it may not be possible to communicate all of what is observed from each sensor to a computing center, because of the bandwidth limitations of the coupling with the sensors.

SUMMARY OF THE INVENTION

The present invention provides a method of deciding whether an observed received signal is a particular signal of interest (SOI), comprising the steps of:

(a) providing a statistical model of the particular signal of interest and a statistical model of the environment when the particular signal of interest is not present; and (b) with a computer, processing the observed received signal in accordance with a decision rule that uses the provided statistical models to decide whether the observed received signal is the particular signal of interest;

wherein the decision rule is:

$$\text{decision} = \begin{cases} SOI & \text{if } LLR(y) > +\lambda \\ \sim SOI & \text{if } LLR(y) < -\lambda \\ \text{unsure} & \text{otherwise} \end{cases} \quad [\text{Eq. 1}]$$

where $$LLR(y) = \log \frac{P(a_1(y) \cdot a_2(y), \ldots \mid SOI)}{P(a_1(y) \cdot a_2(y) \ldots \mid \sim SOI)},$$

where LLR is log likelihood ratio, P denotes a probability, $a_1(y)$ and $a_2(y)$ are functions of first and second attributes of the observed signal y in a sequential order that said attribute functions are presented for computation of LLR(y), and $+\lambda$ and $-\lambda$ are real numbers, wherein the statistical model of the particular signal of interest includes functions of attributes that individually have a probability distribution function $f_1$ when the observed received signal is the particular signal of interest such that $$KL(f_1, f_0) > 0, \quad [\text{Eq. 2}]$$

where $f_0$ is a probability distribution function (PDF) of the respective individual attribute when the observed received signal is not a signal of interest.

In one aspect of the method of the present invention, at least one of the attribute functions is expressed as:

$$a(y_C, y_R) f_c = f_c$$

$$a(y_C, y_R) \Delta f = \Delta f$$

$$a(y_C, y_R) t_c = t_c$$

$$a(y_C, y_R) \Delta t = \Delta t,$$

where $y_C$ is a sample of the observed signal received by a commutated element of a commutated antenna array, $y_R$ is a sample of the observed signal received by a commutated element of the antenna array, f is frequency, and t is time.

In another aspect of the method of the present invention, at least one of the attribute functions is expressed as one of the following:

$$a(y_C, y_R)_{\frac{S}{N}} = \frac{|\langle y_C, y_R \rangle|^2}{\|y_C\|^2 \|y_R\|^2 - |\langle y_C, y_R \rangle|^2}, \quad (\text{i})$$

where $y_c$ is a sample of the observed signal received by a commutated element of a commutated antenna array and $y_R$ is a sample of the observed signal received by a commutated element of the antenna array;

$$a(y_C, y_R) AOA = \arg \max_\Phi \text{Color}^* U(U^* \text{diag}(\text{Energy}) U)^{-1} U^* \text{Color}$$

where $$U_n = \underline{u}_{k_n}(\Phi)$$

$$\text{Color}_n = \langle y_C, y_R \rangle_{R_n}$$

$$\text{Energy}_n = \langle y_R, y_R \rangle_{R_n} \quad (\text{ii})$$

$y_C$ is a sample of the observed signal received by a commutated element of a commutated antenna array and $y_R$ is a sample of the observed signal received by a commutated element of the antenna array;

$$a(y, k)_{Sinusoids} = \frac{\|Y(k)w\|^2}{\|y(k) - Y(k)w\|^2} \quad (\text{iii})$$

where $$w = (Y(k) * Y(k))^{-1} Y(k) * y(k)$$

and k is the k in k-means;

$$a(y, k)_{PSK\ k-ary\ 1} = a(y^k, k) \text{Sinusoids}, \quad (\text{iv})$$

and k is the k in k-means;

$$a(y, k)_{PSK\ k-ary2} = \frac{\sum_i \text{Mean}(C_i)^2}{\sum_i \text{Variance}(C_i)} \quad (\text{v})$$

where $$\{C_i\} = k - \text{means}(\Delta y)$$

and k is the k in k-means;

$$a(y, k)_{PSK\ k\text{-}ary\ 3} = \max_{T \in \left[\frac{1}{2\Delta f}, \frac{2}{\Delta f}\right]} \frac{\sum_i \text{Mean}(C_i)^2}{\sum_i \text{Variance}(C_i)} \quad \text{(vi)}$$

where $$\{C_i\} = k\text{-means}\left(\bigcup_i s'_i\right),$$

and k is the k in k-means;

$$a(y, k)_{QAM\ k\text{-}ary\ 1} = \frac{\sum_i \text{Mean}(C_i)^2}{\sum_i \text{Variance}(C_i)} \quad \text{(vii)}$$

where $$\{C_i\} = k\text{-means}(y^2),$$

and k is the k in k-means;

$$a(y, k)_{QAM\ k\text{-}ary\ 2} = \max_{T \in \left[\frac{1}{2\Delta f}, \frac{2}{\Delta f}\right]} \frac{\sum_i \text{Mean}(C_i)^2}{\sum_i \text{Variance}(C_i)} \quad \text{(viii)}$$

where $$\{C_i\} = k\text{-means}\left(\bigcup_i s'_i\right),$$

k is the k in k-means, f is the frequency of the signal, and U denotes a union operator;

$$a(y)_{AM} = \frac{|<V(\tilde{\omega}_c, y, \omega), V(\tilde{\omega}_c, y, -\omega)>|^2}{\|V(\tilde{\omega}_c, y, \omega)\|^2 \|V(\tilde{\omega}_c, y, -\omega)\|^2 - |<V(\tilde{\omega}_c, y, \omega), V(\tilde{\omega}_c, y, -\omega)>|^2} \quad \text{(ix)}$$

$$\tilde{\omega}_c = \operatorname{argmax}_{\omega_c} |<V(\omega_c, y, \omega), V(\omega_c, y, -\omega)>|^2$$

and ω is frequequncy.

The following is an explanation of the meaning of the term "function of an attribute of the received signal".

Let x(M) denote a transmitted signal where M is the transmitted message. Let y=C(x(M)) denote an associated received signal where C denotes the effect of the channel. Let $x(M) \in H \subset \mathbb{C}^N$ for some set H where H denotes some "class" of signals. For example, H may be the set of all 4-ary PSK or AM modulated signals, in which case H is a proper subset of $\mathbb{C}^N$. Let $y \in \mathbb{C}^N$. x(M) and y are random variables. Let a: $\mathbb{C}^N \to \mathbb{R}$ denote an attribute function and a(y) an attribute of y. a(y) is used to decide whether or not $x(M) \in H$. Let $f_1$ denote the PDF of a(y) when $x(M) \in H$, and $f_0$ denote the PDF of a(y) when $x(M) \notin H$. For an attribute to be useful it is necessary that $f_1$ and $f_0$ are dissimilar. A very important measure of similarity is the Kullback-Leibler divergence defined as, $$KL(f_1, f_0) = \int f_1(u) \log \frac{f_1(u)}{f_0(u)} du \quad \text{[Eq. 3]}$$

Notionally, a(y) is "useful" if $$KL(f_1, f_0) > 0. \quad \text{[Eq. 4]}$$

($KL(f_1, f_0)$ is always non-negative.)

The present invention additionally provides non-transitory computer readable storage media that include computer executable program instructions for causing one or more computers to perform and/or enable one or more of the steps of the above-described methods. Each storage medium may include a plurality of non-transitory media.

Additional features of the present invention are described with reference to the detailed description.

BRIEF DESCRIPTION OF THE DRAWING

FIG. 7 is a diagram showing a further additional processing step in an exemplary embodiment of the method shown in FIG. 2.

FIG. 8 shows the rectangular decomposition of a received signal.

FIGS. 9A and 9B illustrate probability distribution functions $f_1$ and $f_0$ for an attribute, ordinary energy.

DETAILED DESCRIPTION

Figure 1:
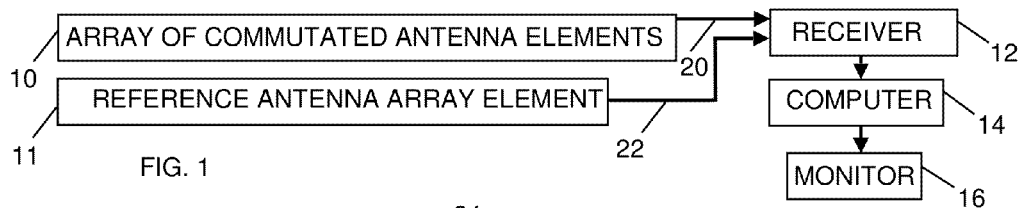
FIG. 1 is a block diagram of an exemplary system in which the method of the present invention is performed.

Referring to FIG. 1, an exemplary system in which the method of the present invention is performed includes an array of commutated antenna elements 10, a reference antenna element 11, a receiver 12, a computer 14 and a computer display monitor 16. In some embodiments the receiver 12 and the computer 14 are combined in a single assembly. The computer 14 contains at least one digital signal processor and non-transitory computer readable storage medium/media that include computer executable program instructions for causing the computer to perform and/or enable the various processing steps that are described herein. These instructions are stored in the computer readable storage medium/media of the computer when the computer is manufactured and/or upon being downloaded via the Internet or from a portable non-transitory computer readable storage medium/media containing such instructions.

Samples 20 of an observed signal received by the array of commutated antenna elements 10 are obtained by the receiver 12 and samples 22 of the observed received signal are obtained by the receiver 12 from the reference antenna element 11. Preferably, the samples 20, 22 of the observed received signal are observed in zero-mean additive white Gaussian noise (AWGN).

Individual samples 20 are obtained from different elements of the array of commutated antenna elements 10. The samples 20, 22 are obtained at different times, at different frequencies and/or by using different CDMA signal access codes. The usefulness of attributes of the received signal increases with the number of samples because the probability distributions functions (PDFs) become more localized with one caveat. From an information-theoretic point-of-view the Sampling Theorem must be respected. More samples that are not statistically independent are not constructive.

The samples 20, 22 of the observed received signal are processed by the computer 14 to decide whether the observed received signal is a particular signal of interest.

Figure 2:
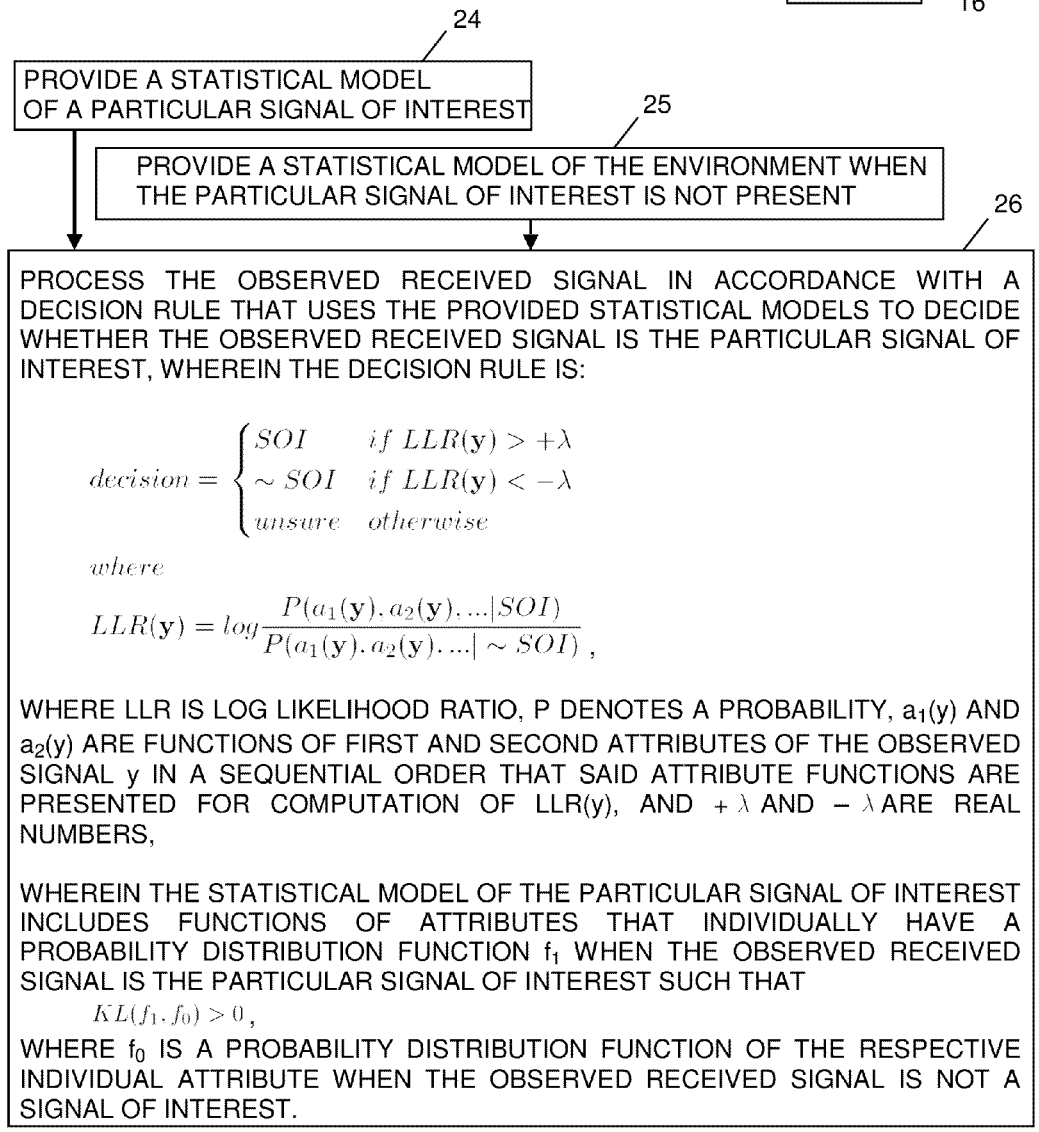
FIG. 2 is a diagram generally showing an exemplary embodiment of the method of the present invention.

Also referring to FIG. 2, a statistical model 24 of the particular signal of interest and a statistical model 25 of the environment when the particular signal of interest is not present are provided, as shown in FIG. 2. The statistical model of the particular signal of interest includes functions of attributes that individually have a probability distribution function $f_1$ when the observed received signal is the particular signal of interest such that $$KL(f_1, f_0) > 0, \quad\quad [\text{Eq. 2}]$$

where $f_0$ is a probability distribution function of the respective individual attribute when the observed received signal is not a signal of interest.

The computer 14 processes the observed received signal samples 20, 22 in accordance with a decision rule that uses the provided statistical models 24, 25 to decide whether the observed received signal is the particular signal of interest, as shown at 26. The decision rule is:

$$\text{decision} = \begin{cases} SOI & \text{if } LLR(y) > +\lambda \\ \sim SOI & \text{if } LLR(y) < -\lambda \\ \text{unsure} & \text{otherwise} \end{cases} \quad [\text{Eq. 1}]$$

where $$LLR(y) = \log \frac{P(a_1(y) \cdot a_2(y), \ldots \mid SOI)}{P(a_1(y) \cdot a_2(y) \ldots \mid \sim SOI)},$$

where LLR is log likelihood ratio, P denotes a probability, $a_1(y)$ and $a_2(y)$ are functions of first and second attributes of the observed signal y in a sequential order that said attribute functions are presented for computation of LLR(y), and $+\lambda$ and $-\lambda$ are real numbers.

$P(a_1(y), a_2(y), \ldots \mid SOI)$ is a model for SOI; and $P(a_1(y), a_2(y), \ldots \mid \sim SOI)$ is a model for ~SOI. For example, when y is a SOI, one would expect LLR(y) to be very large and positive, and specifically, $LLR(y) \gg \lambda$. Opposite expectations apply when y is ~SOI.

The decision rule defined by Equation 1 is ternary. The possible decisions are SOI, ~SOI, and "unsure".

Figure 3:
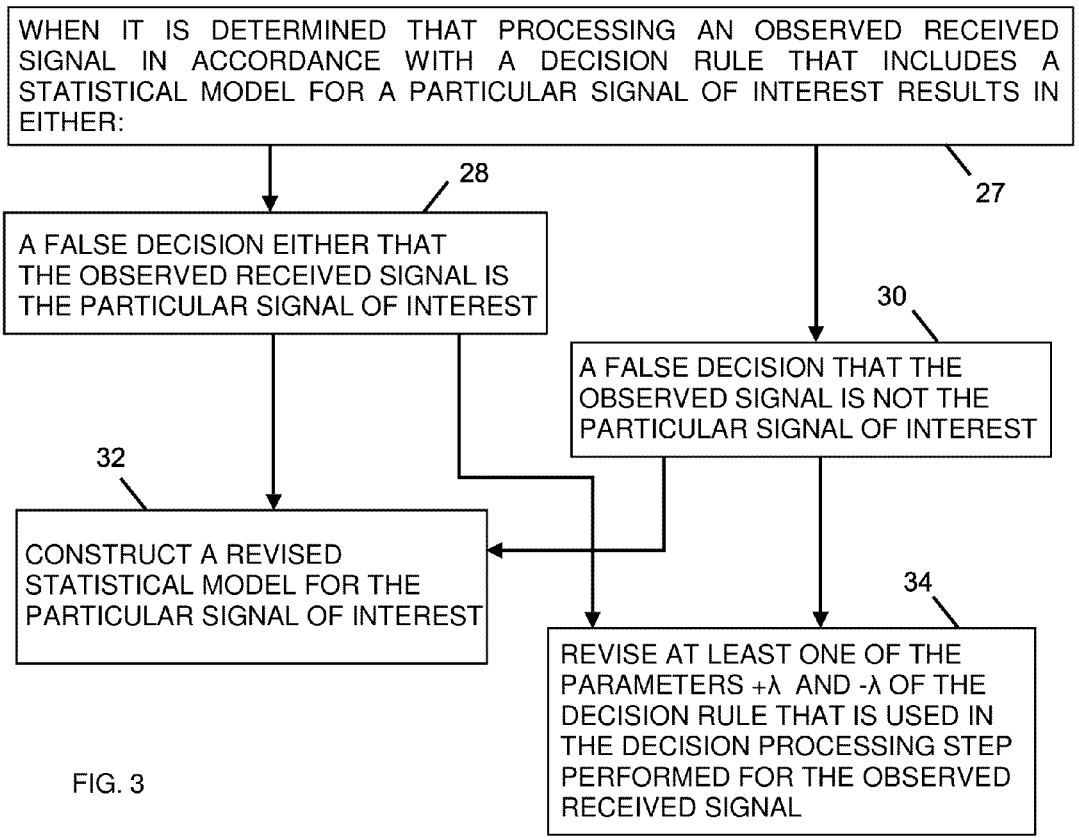
FIG. 3 is a diagram showing additional processing steps in an exemplary embodiment of the method shown in FIG. 2.

Referring to FIG. 3, when it is determined, as shown at 27, that processing by the computer 14 of a particular observed received signal in accordance with a decision rule that includes the statistical model for the particular SOI has resulted in a false decision either that the observed received signal is a signal of interest, as shown at 28, or that the observed signal is not a signal of interest, as shown at 30, the operator causes the computer 14 to construct a revised statistical model for the particular observed signal, as shown at 32, and/or to revise at least one of the parameters $+\lambda$ and $-\lambda$ of the decision rule that is used in the decision processing step for the particular observed signal, as shown at 34. A determination that such processing has resulted in a false decision can be made by a system operator or by some agent external to the system.

Figure 4:
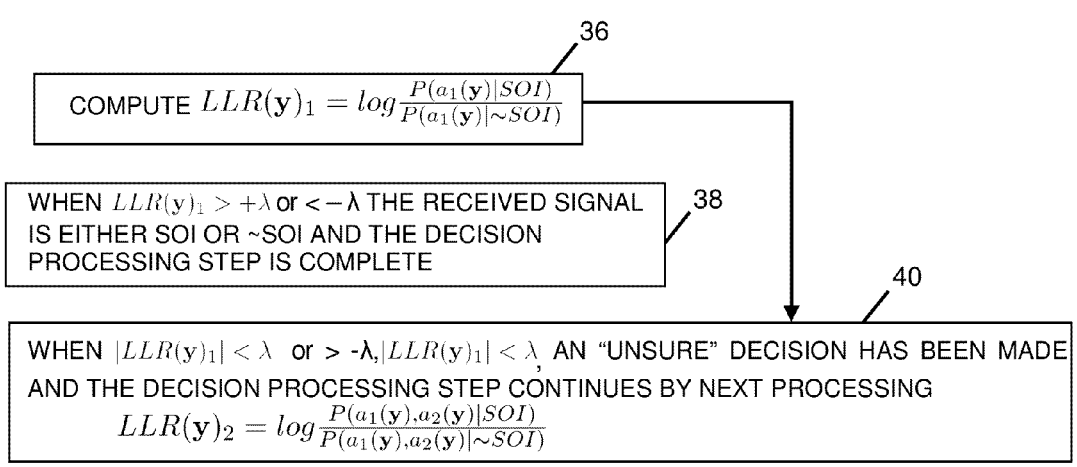
FIG. 4 is a diagram showing another additional processing step in an exemplary embodiment of the method shown in FIG. 2.

Preferably, the decision processing step 26 is incremental in that LLR(y) is computed incrementally for cumulatively ordered sampled attributes $a_1(y), a_2(y), \ldots$ until it is decided whether or not the observed received signal is a signal of interest, as shown in FIG. 4.

The computer 14 first computes $$LLR(y)_1 = \log \frac{P(a_1(y) \mid SOI)}{P(a_1(y) \mid \sim SOI)},$$

as shown at 36. When $LLR(y)_1 > +\lambda$ or $> -\lambda$, it is decided that the received signal is either SOI or ~SOI and the decision processing step is complete, as shown at 38. However, when $|LLR(y)_1| < \lambda$ and $> -\lambda$, an "unsure" decision has been made, and the decision processing step continues by next computing $$LLR(y)_2 = \log \frac{P(a_1(y), a_2(y) \mid SOI)}{P(a_1(y), a_2(y) \mid \sim SOI)},$$

as shown at 40.

When $|LLR(y)_n|$ is either $> \lambda$ or $< -\lambda$, a decision as to whether or not the received signal is a SOI has been made and the decision processing step is complete.

It is possible that after some finite number of computations of $LLR(y)_n$, the decision may remain "unsure". Nonetheless, the decision processing step will be completed with a decision of SOI or ~SOI provided that the attributes functions are defined reasonably and are presented for computation of LLR(y) in an order that minimizes the average time for making a decision as to whether or not the observed received signal is a signal of interest. When the received signal y is a SOI, $LLR(y)_n$ usually increases "almost" monotonically.

Preferably, the attributes functions $a_1(y), a_2(y), \ldots$ are presented for computation of LLR(y) in an order for incremental computation that minimizes the average time for making a decision as to whether or not the observed received signal is a signal of interest. This criterion derives from a classical construction in statistics, the Bayesian Hypothesis Test, wherein it is desired to make a decision among a candidate set of hypotheses. Here the hypotheses are SOI and ~SOI. (The ternary and incremental decision is an extension.) For the Bayesian Hypothesis Test a defined cost function is specified. There is a cost for deciding SOI when the correct hypothesis is ~SOI, and there is a cost for deciding ~SOI when the correct hypothesis is SOI. The Bayesian Hypothesis Test construction minimizes the expected cost. It is also necessary to specify the a priori probabilities of each hypothesis. The Bayesian Hypothesis Test is described at http://en.wikipedia.org/wiki/Bayesian_inference.

For example, one may select the attribute functions $a(y)_{Energy}$ and $a(y_C, y_R)_{f_C}$ and detect a target signal by observing energy over a threshold within the frequency band of a SOI.

Initial Identification of a Target Signal as a SOI

Some approaches for identifying a target signal as a signal of interest SOI for use establishing criteria that are used for constructing the statistical models include the following:

First, after making several passes of the environment while assuming that no SOI is present, a statistical model $P(a_1(y), a_2(y), \ldots \mid \sim SOI)$ of the environment is constructed and stored in a SOI database. When an unusual signal y is detected the unusual signal is processed in relation to the statistical model of the environment to determine whether the unusual signal y is an outlier.

Note that if one were to use only $a(y)_{Energy}$ as an attribute function, ordinary energy detection may be used with a constant false-alarm rate. Here λ has the slightly different interpretation of testing whether the PDF of the attribute is sufficiently small to classify the unusual signal y is an outlier. Note also that it is not sufficient to use a cumulative distribution function CDF of the attribute, as such a technique would fail for a PDF of an attribute that is concentrated at multiple locations.

Secondly, a system operator may specify characteristics of a SOI. For example, this may be something like, $a(y)_{Energy} > \tau$ and $a_{AOA}(y_C, y_R) \in (-15°, +15°)$. A reasonable approach is to regard this as a statement about a PDF. For example, assume that $a(y)_{Energy}$ is uniformly distributed in some bounded range greater than $\tau$ and $a_{AOA}(y_C, y_R)$ is uniformly distributed in the interval $(-15°, +15°)$. The detection process allows these PDF's to be refined once the operator affirms a labeled target as a SOI.

Once the operator affirms a target signal as a SOI, a statistical model $P(a_i(y)|SOI)$ of the target signal is entered into the SOI database as a particular signal of interest. A SOI database entry for a particular signal of interest may be revised upon subsequent identifications of the particular target signal. This calculation is more expensive and preferably is performed in the background. After that, the earlier discussion applies.

Estimation of +λ

An initial value of +λ is estimated by initially labeling target signals in a graphical user interface (GUI) as a SOI in accordance with the estimated value of +λ. The initial value of +λ may be estimated prior to deployment of the system in the field. A target signal that is labeled as a SOI is entered into a SOI database. When it is subsequently determined by a system operator that a particular target signal which has been labeled as a SOI for the estimated +λ is ~SOI, pursuant to feedback from the operator, the particular target signal is removed from the SOI database, and the value of +λ is increased; whereby in the future, it may be more difficult to decide if a received signal is a SOI.

The operator also may provide feedback for the other error type by indicating an instance when a particular target signal is an SOI after the particular target signal had been implicitly labeled as ~SOI by not being labeled as SOI in accordance with the estimated value of +λ.

The estimation of +λ is made in relation to a lower value region of +λ in which it is desired that the decision be "unsure". If one wants to make it more difficult for the decision to be SOI, one should change the value of +λ to increase the region in which the decision is "unsure". One may not want to make a corresponding change to the region in which the decision is ~SOI; whereupon +λ and −λ would not be positive and negative values of the same real number.

For the Bayesian Hypothesis Test the optimal +λ depends on the cost function and the a priori probabilities of the hypotheses.

Determining that Attributes are Useful Attributes

Whenever a system operator affirms that a target signal is an SOI, there is an opportunity to determine which attributes of the target signal are useful attributes by estimating the probability distribution function (PDF) of the each of the individual attributes. Such estimates are made by using kernel density estimation, which is described at http://en.wikipedia.org/wiki/Kernel_density_estimation. For kernel density estimation, the PDF is approximated as a linear combination of translates of a kernel function. The kernel function integrates to 1. For a linear combination of N kernel functions dividing by N ensures that the integral of the linear combination integrates to 1, as required for a PDF. The bandwidth parameter of the kernel function stretches the kernel function along its domain. A smaller bandwidth concentrates the kernel function in a smaller region of its domain. Hence smaller bandwidth produces a linear combination that varies more rapidly. Conversely, larger bandwidth produces a linear combination that varies more smoothly.

The preferred kernel function is the PDF of a Normal distribution. This is probably the most common function used for kernel density estimation. There is no particular significance to the Normal distribution, other than as a PDF, this kernel integrates to 1, as required.

The bandwidth parameter is determined by a cross-validation technique. For a modest number of samples S, the samples are partitioned as $S = S_1 \cup S_2$. For a given bandwidth, one estimates the distribution by using $S_1$ and then assesses the efficacy of the asserted bandwidth by computing the likelihood of $S_2$.

The statistical model $P(a_1(y), a_2(y), \ldots | SOI)$ is a joint distribution. To construct a reasonable estimate of a distribution, there must be enough samples. For a single attribute distributed along a line, this is simple enough. But for even a joint distribution with two attributes, it may be difficult to get enough samples in a plane. This is the so-called curse of dimensionality. It only gets worse with many attributes since the decision rule uses a product of PDF's of the individual attributes. This may be regarded as a joint PDF where it is assumed that the attributes $a_1(y), a_2(y), \ldots$ are statistically independent. This has been found to be a generally satisfactory assumption, albeit not exactly correct.

Criteria for Screening Attributes

When screening attributes that may be considered for representation in the statistical model, an attribute m is preferred over an attribute n for construction of the statistical model of a particular signal of interest when $C(n)\{P(m)-1\} > C(m)\{P(n)-1\}$. $C(i)$ is the time cost of computing attribute i and $P(i)$ is the probability of satisfying the associated criteria.

Presentation of Attribute Functions in an Optimal Order for Computation of LLR(y)

As discussed above, the decision processing step is incremental in that LLR(y) is computed incrementally for cumulatively ordered sampled attributes functions $a_1(y), a_2(y), \ldots$ until it is decided whether or not the observed received signal is a signal of interest; and it is preferable that the attribute functions are presented for computation of LLR(y) in an order that minimizes the average time for making a decision as to whether or not the observed received signal is a signal of interest.

In deciding whether to present a particular attribute function $a_1(y)$ for computation before another attribute $a_2(y)$, one should determine whether attribute $a_1(y)$ is likely to increase $LLR(y)_1$ more rapidly than $a_2(y)$ and/or the relative time costs of observing and computing $a_1(y)$ and $a_2(y)$. The expected increase in $LLR(y)_1$ associated with presenting $a_1(y)$ is the quantity $KL(P(a_1|SOI), P(a_1|\sim SOI))$. The time cost of observing and computing $a_i(y)$ is determined in accordance with:

$$i = \mathrm{argmax}_i \frac{KL(P(a_i | SOI), P(a_i | \sim SOI))}{C_i} \quad \text{[Eq. 5]}$$

An attribute function $a(y)$ that is based upon observations of a particular attribute over different time intervals may be treated in the statistical model as two different attribute functions. For example, an AOA estimate computed over 10 ms takes less observational computation time than the same AOA estimate computed over 20 ms, but may be less useful because it may have a higher variance.

Another consideration is an assumption of statistical independence. When independence of attributes is assumed the PDF of an attribute is an estimate of the marginal PDF with respect to other attributes. Essentially, it is an average over the other attributes. In particular, it is marginal with respect to S/N. The instantaneous S/N may differ considerably from the average and it is appropriate to revise the estimate of the rate of change of LLR(y) for a particular attribute selection once that attribute has been selected. This is very similar to the exploitation/exploration paradigm in reinforcement learning.

Reinforcement Learning

In some exemplary embodiments, reinforcement learning is used to allocate computer resources for performing the decision processing step 26.

Reinforcement learning is an area of machine learning in computer science, concerned with how an agent ought to take actions in an environment so as to maximize some notion of cumulative reward. Reinforcement learning involves trial-and-error and feedback to arrive at the cumulative reward. Examples of cumulative rewards that are applicable to the present method of determining whether a particular observed signal is a signal of interest are: (1) minimizing the time cost of computation, such as by minimizing the average time for making a decision as to whether or not the observed received signal is a signal of interest; (2) minimizing the time cost of observing the attributes; and (3) minimizing the time cost of communicating the observed attributes.

Figure 5:
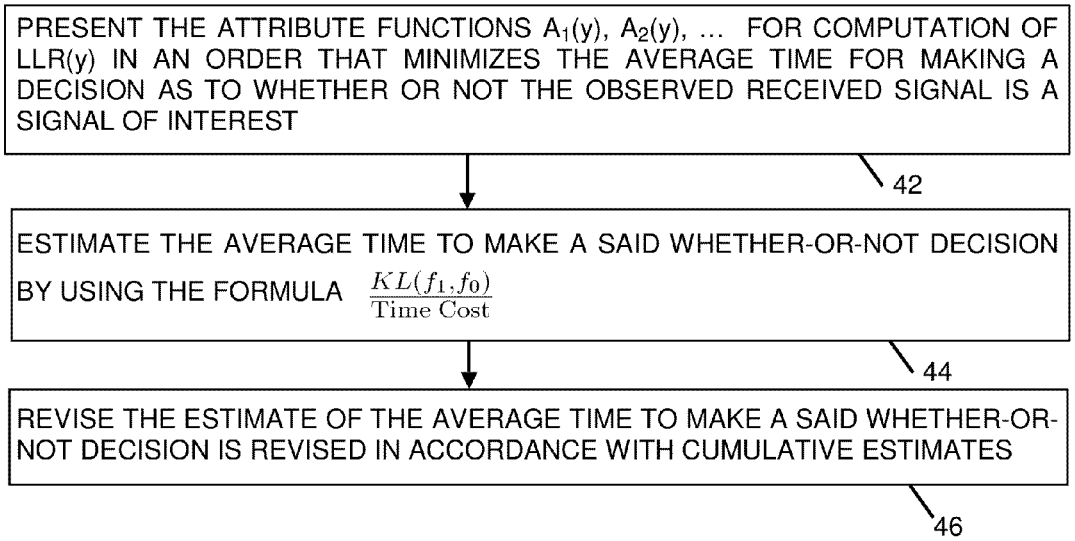
FIG. 5 is a diagram showing still other additional processing steps in an exemplary embodiment of the method shown in FIG. 2.

Referring to FIG. 5, during the construction of a statistical model for a particular signal of interest, the attribute functions $a_1(y), a_2(y), \ldots$ are so ordered, as shown at 42, that during the decision processing step 26 the attribute functions $a_1(y), a_2(y), \ldots$ are presented for computation of LLR(y) in an order that minimizes the average time for making a decision as to whether or not the observed received signal is a signal of interest.

The average time to make a decision that completes the decision processing step 26 is estimated by using the formula $$\frac{KL(f_1, f_0)}{\text{Time Cost}},$$

as shown at 44. The estimate of the average time to make a decision is revised in accordance with cumulative estimates, as shown at 46.

In some exemplary embodiments, reinforcement learning is used to allocate spectral tuning resources and/or temporal tuning resources and/or receiver gain resources for the statistical model construction step.

The time cost of communicating observed attributes is relevant to a situation in which both the time of arrival and the angle of arrival of the observed received signal are communicated from a sensor network. Computing the time of arrival requires samples on the order of the bandwidth (i.e. the Nyquist Theorem). This may involve a lot of data; and the time cost of sending this data may be very large.

A useful reinforcement learning method is the so-called N-armed bandit paradigm, which is described at http://en.wikipedia.org/wiki/Multi-armed_bandit.

Distinguishing Different Observed Received Signals of Interest From One Another

Figure 6:
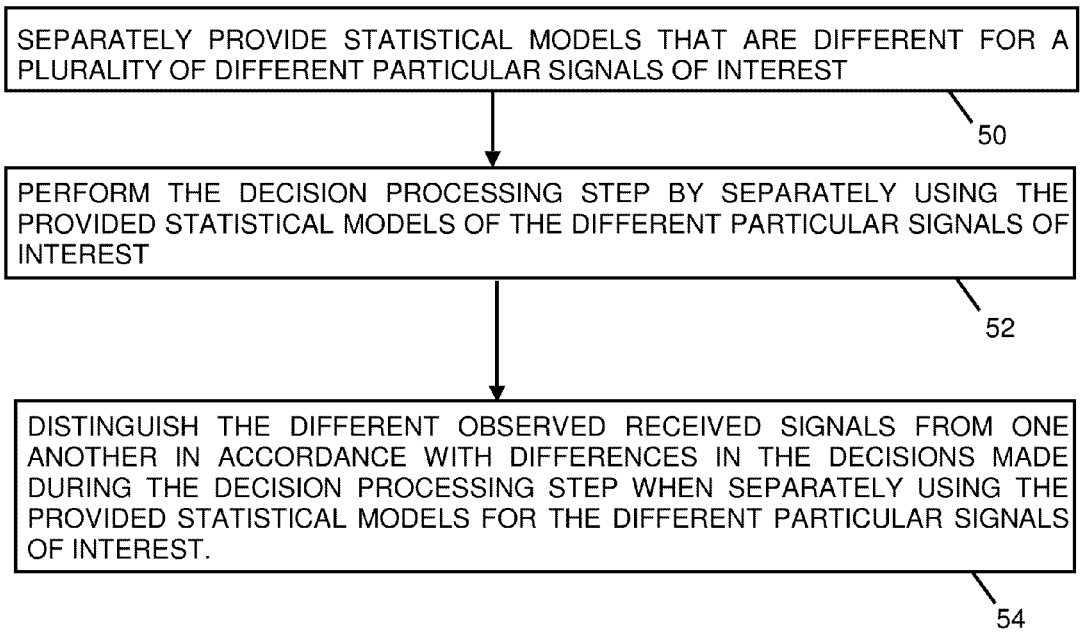
FIG. 6 is a diagram showing yet other additional processing step in an exemplary embodiment of the method shown in FIG. 2.

Referring to FIG. 6, in an exemplary embodiment, different observed received signals of interest are distinguished from one another by using the method of the present invention. Statistical models that are different for a plurality of different particular signals of interest received signals are separately provided, as shown at 50; and the decision processing step 26 (FIG. 2) is performed, as shown at 52, by separately using the provided statistical models of the different particular signals of interest. The different observed received signals are then distinguished from one another in accordance with the differences in the decisions made when separately using the provided statistical models for the different particular signals of interest, as shown at 54.

Referring to FIG. 7, in an exemplary embodiment, a statistical model is constructed for the union of a particular set of observed signals and other observed signals by using attributes associated with selected criteria for distinguishing the particular set of observed signals from the other observed signals, as shown at 56.

Attribute Functions

The following is a discussion of how some attribute functions may be used in the statistical models in exemplary embodiments of the present invention for different types of attributes. An attribute is a function of an instance of an observed signal.

Energy or S/N

For any rectangle one may compute, $$a(y_C, y_R)_{\frac{S}{N}} = \frac{|\langle y_C \cdot y_R \rangle|^2}{\|y_C\|^2 \|y_R\|^2 - |\langle y_C \cdot y_R \rangle|^2} \quad [\text{Eq. 6}]$$

where $\langle \ldots \rangle$ denotes inner-product and $y_C$ and $y_R$ denote samples from the commutated and reference elements respectively. From earlier material and here stated without proof, this is an estimate of $$\frac{S}{N}$$

for 2 antenna elements in AWGN and a single coordinate descent step. The denominator is always non-negative. As the energy of the noise approaches zero, $y_C \to s y_R$ for some complex scalar s and $a(y_C, Y_R) \to \infty$.

Ordinary Energy $$a(y)_{Energy} = \|y\|^2 \quad [\text{Eq. 7}]$$

Notice that instead of $a(y_C, y_R)$ this attribute function has been written as $a(y)$. This highlights the fact that this attribute function calculation does not require both the commutated and reference element samples, and either $y = y_R$ or $y = y_C$ may be used. Or, one could use both for a slight improvement. Under the assumption of AWGN for the channel, the distribution of $a(y)$ is easy to understand. $a(y)$ has a chi-square distribution for $x(M) \notin H$. If we may also assume $x(M) \in H$ has constant energy, then $a(y)$ is non-central chi-square for $x(M) \in H$. Typical $f_1$ and $f_0$ are shown in FIGS. 9A and 9B, where one can see that $a(y)$ is useful as $KL(f_1, f_0) > 0$.

Spectral and Temporal Support

The support of a function refers to the subset of its domain where the function is non-zero. For the rectangular decomposition of a received signal, as shown in FIG. 8, the spectral support is characterized by $f_c$ and $\Delta f$, and the temporal support is characterized by $t_c$ and $\Delta t$.

In some embodiments, energy and $f_c$ could be the only attributes used to identify an SOI. This is clearly unnecessarily restrictive.

For the present invention one may use any of the following attribute functions to identify a SOI:

$$a(y_C, y_R) f_c = f_c$$

$$a(y_C, y_R) \Delta f = \Delta f$$

$$a(y_C, y_R) t_c = t_c$$

$$a(y_C, y_R) \Delta t = \Delta t, \quad [\text{Eq. 8}]$$

As before, one may also use $a(y)$ rather than $a(y_C, y_R)$.

Here $x(M) \in H$ for some SOI, and otherwise $x(M) \notin H$ for other signals that are not of interest. Generally, one would expect $a(y_C, y_R)$ to have a broader distribution for $x(M) \notin H$ (, as characterized by $f_0$). For example, in some concepts of operation, the notion is that entirety of the probability mass of $f_1$ is located near $f_c$.

Angle of Arrival (AOA)

In the rectangular decomposition of a received signal, as shown in FIG. 8, for any rectangle R the color of the rectangle Color(R) is defined as the complex scalar, $$\text{Color}(R) = \langle y_C, y_R \rangle_R. \quad [\text{Eq. 9}]$$

The subscript R on the inner-product indicates that the computation of the inner-product is restricted by the spectral and temporal support of the rectangle R. What is rendered in FIG. 8 is Arg{Color(R)}. It has been previously demonstrated that the color sequence in the rectangular decomposition is a sufficient statistic for computing an MLE (most likely estimation) of the AOA. Accordingly, one may define an attribute function as a point estimate of the AOA in accordance with, $$a(y_C, y_R)_{AOA} = \text{arg max}$$
$$_\Phi \text{Color}^* U (U^* \text{diag}(\text{Energy}) U)^{-1} U^* \text{Color}$$

where $$U_n = u_{k_n}(\Phi)$$

$$\text{Color}_n = \langle y_C, y_R \rangle_{R_n}$$

$$\text{Energy}_n = \langle y_R, y_R \rangle_{R_n} \quad [\text{Eq. 10}]$$

$u_{k_n}(\Phi)$ is taken from the calibration tables for the antenna, the response of antenna element $k_n$ o a signal from angle $\Phi$. Note that this is a multiple angle calculation and to compute a single angle $\Phi$ is restricted to a single tuple. As in the case of the above discussed spectral and temporal support attributes, $x(M) \in H$ for some SOI, and otherwise $x(M) \notin H$ for other signals that are not of interest. Generally, one would expect $a(y_c, y_R)$ to have a broader distribution for $x(M) \notin H$ (as characterized by $f_0$). A related attribute is the a posteriori PDF of the AOA. Here the range of $a(y_C, y_R)$ is the set of all non-negative functions that integrate to 1 defined on the interval $[-\pi, +\pi]$.

For the next group of attributes functions, specific structural assumptions are made about $x(M)$. These attribute functions include: (a) multiple sinusoids to include CW and FSK, (b) PSK, (c) FM and QAM, (d) AM and DSB, and (e) SSB. For these attribute functions, the channel is more problematic for several reasons. First, frequency error is unconstrained. Secondly, digital modulation samples obtained away from the center of a symbol may not exhibit the characteristics of the constellation.

CW and FSK.

Spectrum estimation is a classic signal processing problem and there are many different approaches, each with advantages and disadvantages.

Suppose $x(M)_n = s\, e^{i\omega n}$ where s is a complex scalar that models amplitude and phase and $\omega$ is the frequency of the sinusoid. Of course, s and $\omega$ are unknown. Let $y = x(M) + v$ where v is AWGN.

One approach is to compute the MLE for $\omega$ and s and then compute the associated $$\frac{S}{N}.$$

Here, $$\omega_{MLE} = \text{arg max}_\omega |\Im(y, \omega)|^2 \quad [\text{Eq. 11}]$$

$$s_{MLE} = \Im(y, \omega_{MLE}). \quad [\text{Eq. 12}]$$

$\Im$ denotes the Fourier transform.

With $$\tilde{x}_n = s_{MLE} e^{i\omega_{MLE} n}, \quad \frac{S}{N} = \frac{\|\tilde{x}\|^2}{\|y - \tilde{x}\|^2}. \quad [\text{Eq. 13}]$$

While this method enjoys certain statistical optimality and this is a simple calculation for a single sinusoid, the product space of the parameters quickly becomes problematic for multiple sinusoids.

One alternative method is AR spectral modeling. Here, $y(n)$ is approximated as a linear combination of immediately preceding samples. One earlier sample is required for each sinusoid. For example, for one sinusoid $y(n) = \omega_1 y(n-1)$ where $\omega_1 = e^{107}$. In general, $y = Yw$ for an appropriately defined Y. Generally, w is estimated by ordinary LS as, $w = (Y^*Y)^{-1} Y^* y$ and the computational complexity of this algorithm is determined by the computation of w. For a small number of sinusoids Cramer's rule may be used. For larger problems notionally Gaussian elimination may be used, but recognizing that $Y^*Y$ is Toeplitz, the Levinson-Durbin algorithm is preferred for $O(N^2)$ complexity.

$$\frac{S}{N} = \frac{\|Yw\|^2}{\|y - Yw\|^2}.$$

In AR spectral modeling the estimated frequencies of the sinusoids are determined by the locations of the zeros of the FIR filter determined by w.

Using an AR spectral model, $$a(y, k)_{Sinusoids} = \frac{\|Y(k)w\|^2}{\|y(k) - Y(k)w\|^2} \quad [\text{Eq. 14}]$$

where $$w = (Y(k) * Y(k))^{-1} Y(k) * y(k)$$

Here k denotes the order of the AR model and the number of sinusoids. k is the number of tuples of w. For example, for CW k=1 and for binary FSK k=2.

Notice that because of modulation, binary FSK is not a sum of two pure sinusoids. An AR model is essentially an FIR filter, and symbol transitions induce a transient of length k−1. This degrades $$\frac{S}{N}$$

and a more elegant solution would be to detect these transients (by anomalous energy) and delete these samples from the calculation of w. This produces much better behavior for a(y,k), but also destroys the Toeplitz structure of Y*Y and thereby significantly increases computational difficulty.
PSK Consider first the idealized case where the receiver samples only at the center of a transmit symbol. For k-ary PSK, $$x(M)_n = s e^{iwn} e^{i\frac{2\pi}{k}m_n}$$

where s is an unknown complex gain and ω is an unknown frequency error. $m_n \in \mathbb{Z}$ is the unknown transmit data sequence. Let y=x(M)+v where v is AWGN.

A first approach is to observe that $\{x(M)_n\}^k = s'e^{ik\omega n}$ and absent noise $(y_n)^k = \{x(M)_n\}^k$. Let $y^k$ denote this vector. $y^k$ is a sinusoid at frequency kω and it is reasonable to define, $$a(y,k)_{PSK\,k-ary\,1} = a(y^k, k)_{Sinusoids} \qquad [\text{Eq. 15}]$$

A second approach is to observe that $$x(M)_n \overline{x(M)_{n-1}} = s' e^{iw} e^{i\frac{2\pi}{k}m'}$$

and absent noise $$y_n \overline{y_{n-1}} = x(M)_n \overline{x(M)_{n-1}}.$$

Let $$(\Delta y)_n = y_n \overline{y_{n-1}}.$$

Δy is the same k-ary constellation rotated by ω.

The efficacy of a 4-ary PSK model may be determined by applying k-means (with k=4) and computing $$\frac{S}{N}.$$

Let $\{C_i\}$=k-means(Δy) where $\{C_i\}$ is a set of clusters which represent a partition of the points of Δy. For any single cluster C we may define $$\frac{S}{N} = \frac{\text{Mean}(C)^2}{\text{Variance}(C)}.$$

Similarly, for the set of all clusters $\{C_i\}$ we may define $$\frac{S}{N} = \frac{\sum_i \text{Mean}(C_i)^2}{\sum_i \text{Variance}(C_i)}.$$

Accordingly, $$a(y,k)_{PSK\,k-ary\,2} = \frac{\sum_i \text{Mean}(C_i)^2}{\sum_i \text{Variance}(C_i)} \qquad [\text{Eq. 16}]$$

where $$\{C_i\} = k - \text{means}(\Delta y)$$

For the purpose of implementation, it is desirable to seed each k-means trial with k points that are uniformly spaced on a circle with random rotation. The result is independent of the radius of the circle used for this seeding.

Now consider what happens when samples are not necessarily taken at the center of transmit symbols. Suppose that the center of the first transmit symbol is at time $t_0$ and the center of the $n^{th}$ symbol is at time $t_0+(n-1)T$. There are two issues here. The receiver does not know $t_0$ or T. Generally, the difficulty here is to determine an appropriate set of sampling instants, by a reasonable computation. The following method has been found to satisfy this requirement.

Begin by fixing an estimate of T. Let $\tilde{T}$ be an estimate of T. Consider $$\tilde{T} \in \left[\frac{1}{2\tilde{\Delta}f} \cdot \frac{2}{\tilde{\Delta}f}\right]$$

where $\tilde{\Delta}f = a(y_C, y_R)_{\Delta f}$. Let $$S_i = \bigcup_{t \in [i\tilde{T} \cdot (i+1)\tilde{T}]} y(t+\tilde{T})\overline{y(t)}.$$

The density with which samples are taken in a $\tilde{T}$ interval may vary, but generally four samples are satisfactory. For T=$\tilde{T}$ there is at least one sample of the form $$s' e^{iw} e^{i\frac{2\pi}{k}m'}.$$

Other samples will be in a neighborhood of this value and generally there will be no bias in the error because of source compression (i.e. adjacent symbols are independent).

Figure 10:
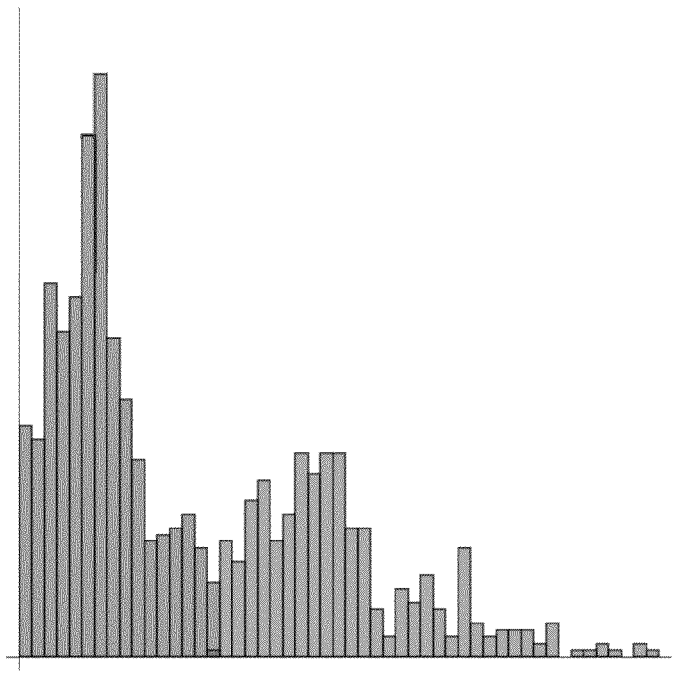
FIG. 10 is an exemplary histogram of k-means clusters for an attribute, PSK.

Let $\{C_i\}$=k-means($\cup_i S_i$) and $\mu_i$=Mean($C_i$). For the cluster $\{C_i\}$ determine a partition wherein $\cup_i S_i$ and $\mu_i$ are the cluster centers. FIG. 10 is an exemplary histogram of clusters.

Let $s'_i = \arg\min_{u \in S_i} |\mu_i - u|^2$. That is, $s'_i$ is that element of $S_i$ that is closest to $\mu_i$. Let $\mu'_i$=k-means($\cup_i s'_i$). This process may be iterated. It appears that typically five iterations are sufficient to determine the correct subset of the samples. That is, to determine the centers of the transmit symbols. Thus, $$a(y,k)_{PSK\ k-ary3} = \max_{\tilde{T} \in \left[\frac{1}{2\tilde{\Delta}f} \cdot \frac{2}{\tilde{\Delta}f}\right]} \frac{\sum_i \text{Mean}(C_i)^2}{\sum_i \text{Variance}(C_i)} \quad [\text{Eq. 17}]$$

where $$\{C_i\} = k - \text{means}\left(\bigcup_i s_i'\right)$$

It is still appropriate to retain $a(y,k)_{PSK\ k-ary\ 2}$ as defined previously, for instances where the knowledge of symbol timing is present.

FM and QAM.

The treatment of FM and QAM is similar to the above discussed treatment of PSK. Consider first the idealized case where the receiver samples only at the center of a transmit symbol. For QAM, $x(M)_n = s\, e^{i\omega n} u(m_n)$ where s is an unknown complex gain and $\omega$ is an unknown frequency error. $u(m_n)$ is an unknown transmit data symbol, and element of the QAM constellation. Let $y = x(M) + v$ where v is AWGN.

A first approach is to observe that $|x(M)_n|^2 \in A$ where #A=k and absent noise $|y_n|^2 = |x(M)_n|^2$. (# denotes cardinality.) Let $y^2$ denote this vector. Thus $(y^2)_n \in A$ where #A=k.

k is the number of distinct amplitude rings. For QAM k>1 and typically small (i.e. 2 or 3). For FM k=1 and FM is distinguished from k-ary PSK because FM does not exhibit the k-ary PSK constellation.

It follows that one may use, $$a(y,k)_{QAM\ k-ary1} = \frac{\sum_i \text{Mean}(C_i)^2}{\sum_i \text{Variance}(C_i)} \quad [\text{Eq. 18}]$$

where $$\{C_i\} = k - \text{means}(y^2)$$

As above, now consider what happens when samples are not necessarily taken at the center of transmit symbols. Begin by fixing an estimate of T and consider $$\tilde{T} \in \left[\frac{1}{2\tilde{\Delta}f} \cdot \frac{2}{\tilde{\Delta}f}\right].$$

Let $S_i = \bigcup_{t \in [i\tilde{T},(i+1)\tilde{T}]} |y(t)|^2$. For $T = \tilde{T}$ there exists $s \in S_i$ such that $s \in A$.

Let $\{C_i\} = k\text{-means}(\bigcup_i S_i)$ and $\mu_i = \text{Mean}(C_i)$. The cluster $\{C_i\}$ determine a partition of $\bigcup_i S_i$ and $\mu_i$ are the cluster centers.

As before, let $s'_i = \arg\min_{u \in S_i} |\mu_i - u|^2$ and $\mu'_i = k\text{-means}(\bigcup_i s'_i)$, and iterate.

Thus, $$a(y,k)_{QAM\ k-ary2} = \max_{\tilde{T} \in \left[\frac{1}{2\tilde{\Delta}f} \cdot \frac{2}{\tilde{\Delta}f}\right]} \frac{\sum_i \text{Mean}(C_i)^2}{\sum_i \text{Variance}(C_i)} \quad [\text{Eq. 19}]$$

where $$\{C_i\} = k - \text{means}\left(\bigcup_i s_i'\right)$$

Note that this algorithm is identical to the earlier algorithm for PSK. The difference is in the definition of $S_i$.

For PSK $$S_i = \bigcup_{t \in [i\tilde{T},(i+1)\tilde{T}]} y(t+\tilde{T})\overline{y(t)}$$

and for QAM $S_i = \bigcup_{t \in [i\tilde{T},(i+1)\tilde{T}]} |y(t)|^2$. There are also some minor differences in an appropriate implementation of k-means. It is still appropriate to retain $a(y,k)_{QAM\ k-ary\ 1}$ as defined previously, for instances where the knowledge of symbol timing is present.

AM or DSB.

For $x_n = s\, e^{i\omega_c n} u_n$ where $\Im u_n = 0$. That is, $u_n$ is purely real. Note the use of $\omega_c$ rather than the earlier $\omega$.

Recall, from the inverse Fourier Transform $u_n = \int_\omega s_-(\omega)e^{-\omega n} + s_+(\omega)e^{+\omega n}$. $\Im u_n = 0$ implies $s_-(\omega)e^{-\omega n}$ and $s_+(\omega)e^{+\omega n}$ are conjugates, and this implies that $s_-(\omega)$ and $s_+(\omega)$ are conjugates. Thus, $|\Im(u,\omega)|$ is an even function of $\omega$ and Arg $\Im(u,\omega)$ is an odd function of $\omega$. The important observation is $\Im(u,\omega) = \Im(u,-\omega)$. This is the characteristic that will be used to identify AM (or DSB).

Suppose one knows $\omega_c$. Letting $V(w_c,y,\omega) = \Im(e^{-\omega_c n} y_n, \omega)$ one may test for whether or not $V(\omega_c,y,\omega) \approx V(\omega_c,y,-\omega)$. This is the same relationship that exists between the commutated and reference samples in the presence of a target signal (in AWGN), in the construction of the rectangular decomposition. Hence, the following estimate is appropriate:

$$a(y)_{AM} = \frac{|<V(\tilde{\omega}_c,y,\omega),V(\tilde{\omega}_c,y,-\omega)>|^2}{\|V(\tilde{\omega}_c,y,\omega)\|^2 \|V(\tilde{\omega}_c,y,-\omega)\|^2 - |<V(\tilde{\omega}_c,y,\omega),V(\tilde{\omega}_c,y,-\omega)>|^2} \quad [\text{Eq. 20}]$$

$$\tilde{\omega}_c = \text{argmax}_{\omega_c} |<V(\omega_c,y,\omega),V(\omega_c,y,-\omega)>|^2$$

The first term in the denominator has no dependence on $\omega_c$ (by Parseval's theorem). Hence, $a(y)_{AM}$ is maximized over $\omega_c$ when the numerator is maximal. This justifies the estimate $\tilde{\omega}_c$.

Practically, the computation of $\tilde{\omega}_c$ is much simpler than it appears. One need only compute three FFT's. Compute one FFT transform, flip this over the $\omega$-axis (a reversal), and correlate this with the unmodified transform to determine $\tilde{\omega}_c$. This correlation may again be computed with two FFT's.

Implementation of Operation

Figure 11:
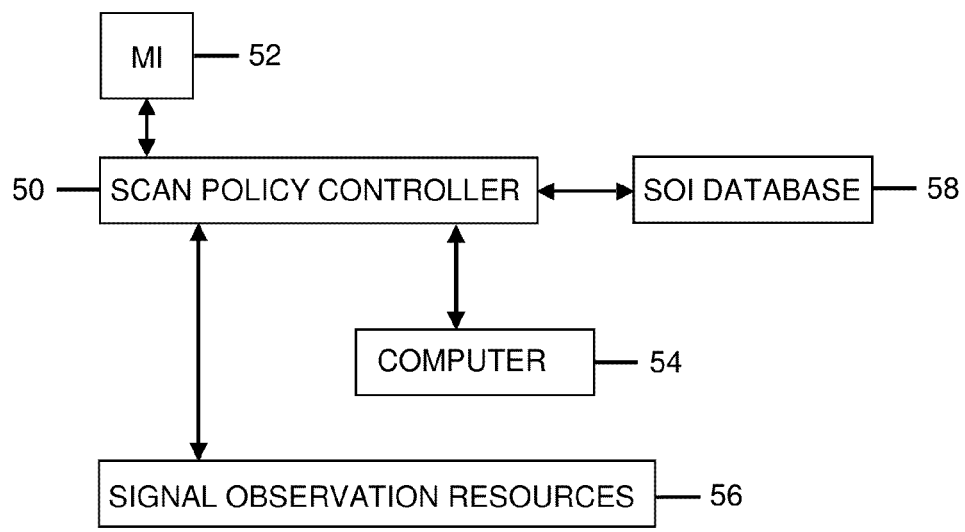
FIG. 11 is a diagram of a system for implementing operation of the method shown in FIG. 2.

Referring to FIG. 11, operation of the method of the present invention is implemented by a scan policy controller 60 in combination with a machine interface (MI) 62, a computer 64, signal observation resources 66 and a SOI database 68.

The MI 62 is embodied in the computer 64 (14 in FIG. 1) and the computer monitor (16 in FIG. 1) or may be embodied separately therefrom.

Also referring to FIGS. 1 and 2, the computer 64 (14 in FIG. 1) is programmed for constructing the statistical models of particular signals of interest 24 and the statistical model of the environment 25, and for processing the observed received signal during step 26 in accordance with the decision rule to decide whether the observed received signal is a SOI.

The signal observation resources 56 include antennas and receivers 10, 11, 12 that can be controlled to access specified attributes of the observed received signal for use in constructing the statistical models 24, 25.

The scan policy controller 60 is a collection of apparatus that control the signal observation resources 66 and the operation of the computer 64. The scan policy controller 60 is embodied in the computer 64 (14 in FIG. 1) and the computer monitor (16 in FIG. 1) or may be embodied separately therefrom.

The SOI database 66, which may be included in the computer 64, stores a statistical model for the environment 25 and statistical model for particular SOI's. Statistical models of target signals that are identified as signals of interest are entered into the SOI database upon affirmation by the operator that a particular target signal that has been identified as a SOI is indeed a SOI. The statistical models for particular SOI's are specified by the system operator.

When the operator desires a decision by the computer 64 as to whether an observed received signal is a particular SOI, the operator causes the statistical model for the particular SOI to be accessed by the scan policy controller 60 from the SOI database 66 and used for construction of the statistical model for the observed received signal; and the scan policy controller 60 decides whether the observed received signal is the particular SOI.

The MI 62 facilitates operation of the scan policy controller by a system operator by enabling the operator to specify and/or revise the attributes of a target signal that are used to construct the statistical model and/or to revise parameters of the decision rule in response to decisions made by the computer 64 (14 in FIG. 1) as to whether the observed received signal is a SOI.

A significant benefit of the methods described herein is reducing operator workload. This is realized by automating operator tasks that have historically been manual, wherever possible.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

LIST OF ACRONYMS

AM Amplitude modulation
AOA Angle-of-arrival
AR Autoregressive
AWGN Additive white Gaussian noise
CDF Cumulative distribution function
CW Continuous wave
DSB Double sideband
FIR Finite impulse response
FM Frequency modulation
FSK Frequency shift keying
GUI Graphical user interface
KL Kullback-Leibler divergence
LLR Log likelihood ratio
LS Least-squares
MLE Maximum-likelihood estimate (or estimator)
MI Machine interface
PDF Probability density function
QAM Quadrature amplitude modulation
SOI Signal-of-interest $$\frac{S}{N}$$

Signal-to-noise ratio

The invention claimed is:

1. A method of deciding whether an observed received signal is a particular signal of interest (SOI), comprising the steps of:
    (a) providing a statistical model of the particular signal of interest and a statistical model of the environment when the particular signal of interest is not present; and
    (b) with a computer, processing the observed received signal in accordance with a decision rule that uses the provided statistical models to decide whether the observed received signal is the particular signal of interest;
    wherein the decision rule is:

$$\text{decision} = \begin{cases} SOI & \text{if } LLR(y) > +\lambda \\ \sim SOI & \text{if } LLR(y) < -\lambda \\ \text{unsure} & \text{otherwise} \end{cases}$$

where $$LLR(y) = \log \frac{P(a_1(y), a_2(y), \ldots | SOI)}{P(a_1(y), a_2(y), \ldots | \sim SOI)},$$

where LLR is log likelihood ratio, P denotes a probability, $a_1(y)$ and $a_2(y)$ are functions of first and second attributes of the observed signal y in a sequential order that said attribute functions are presented for computation of LLR(y), and $+\lambda$ and $-\lambda$ are real numbers,
    wherein the statistical model of the particular signal of interest includes functions of attributes that individually have a probability distribution function $f_1$ when the observed received signal is the particular signal of interest such that $$KL(f_1, f_0) > 0,$$

where $f_0$ is a probability distribution function of the respective individual attribute when the observed received signal is not a signal of interest; and
    wherein at least one of the attribute functions is expressed as:

$$a(y_C, y_R) f_c = f_c$$

$$a(y_C, y_R) \Delta f = \Delta f$$

$$a(y_C, y_R) t_c = t_c$$

$$a(y_C, y_R) \Delta t = \Delta t,$$

where $y_C$ is a sample of the observed signal received by a commutated element of a commutated antenna array, $y_R$ is a sample of the observed signal received by a commutated element of the antenna array, f is frequency, and t is time.

2. A method according to claim 1, wherein the attribute functions $a_1(y), a_2(y), \ldots$ are presented for computation of LLR(y) in an order that is in accordance with the time cost of observing the attributes.

3. A method according to claim 1, wherein the attribute functions $a_1(y), a_2(y), \ldots$ are presented for computation of LLR(y) in an order that is in accordance with the time cost of computation.

4. A method according to claim 1, wherein the attribute functions $a_1(y), a_2(y), \ldots$ are presented for computation of LLR(y) in an order that is in accordance with the time cost of communicating the observed attribute.

5. A non-transitory computer readable storage medium for use with a computer in a system for deciding whether an observed received signal is a particular signal of interest (SOI), wherein the computer readable storage medium contains computer executable program instructions for causing the computer to perform the step of:

(a) processing the observed received signal in accordance with a decision rule that uses a statistical model of the particular signal of interest and a statistical model of the environment when the particular signal of interest is not present to decide whether the observed received signal is the particular signal of interest;

wherein the decision rule is:

$$\text{decision} = \begin{cases} SOI & \text{if } LLR(y) > +\lambda \\ \sim SOI & \text{if } LLR(y) < -\lambda \\ \text{unsure} & \text{otherwise} \end{cases}$$

where $$LLR(y) = \log \frac{P(a_1(y), a_2(y), \ldots | SOI)}{P(a_1(y), a_2(y), \ldots | \sim SOI)},$$

where LLR is log likelihood ratio, P denotes a probability, $a_1(y)$ and $a_2(y)$ are functions of first and second attributes of the observed signal y in a sequential order that said attribute functions are presented for computation of LLR(y), and $+\lambda$ and $-\lambda$ are real numbers, wherein the statistical model of the particular signal of interest includes functions of attributes that individually have a probability distribution function $f_1$ when the observed received signal is the particular signal of interest such that $KL(f_1, f_0) > 0$, where $f_0$ is a probability distribution function of the respective individual attribute when the observed received signal is not a signal of interest; and wherein at least one of the attribute functions is expressed as:

$a(y_C, y_R) f_c = f_c$ $a(y_C, y_R) \Delta f = \Delta f$ $a(y_C, y_R) t_c = t_c$ $a(y_C, y_R) \Delta t = \Delta t,$ where $y_C$ is a sample of the observed signal received by a commutated element of a commutated antenna array, $y_R$ is a sample of the observed signal received by a commutated element of the antenna array, f is frequency, and t is time.

6. A method of deciding whether an observed received signal is a particular signal of interest (SOI), comprising the steps of:

(a) providing a statistical model of the particular signal of interest and a statistical model of the environment when the particular signal of interest is not present; and (b) with a computer, processing the observed received signal in accordance with a decision rule that uses the provided statistical models to decide whether the observed received signal is the particular signal of interest;

wherein the decision rule is:

$$\text{decision} = \begin{cases} SOI & \text{if } LLR(y) > +\lambda \\ \sim SOI & \text{if } LLR(y) < -\lambda \\ \text{unsure} & \text{otherwise} \end{cases}$$

where $$LLR(y) = \log \frac{P(a_1(y), a_2(y), \ldots | SOI)}{P(a_1(y), a_2(y), \ldots | \sim SOI)},$$

where LLR is log likelihood ratio, P denotes a probability, $a_1(y)$ and $a_2(y)$ are functions of first and second attributes of the observed signal y in a sequential order that said attribute functions are presented for computation of LLR(y), and $+\lambda$ and $-\lambda$ are real numbers, wherein the statistical model of the particular signal of interest includes functions of attributes that individually have a probability distribution function $f_1$ when the observed received signal is the particular signal of interest such that $KL(f_1, f_0) > 0$, where $f_0$ is a probability distribution function of the respective individual attribute when the observed received signal is not a signal of interest; and wherein at least one of the attribute functions is expressed as one of the following:

$$a(y_C, y_R)_{\frac{S}{N}} = \frac{|<y_C, y_R>|^2}{\|y_C\|^2 \|y_R\|^2 - |<y_C, y_R>|^2}, \quad (i)$$

where $y_C$ is a sample of the observed signal received by a commutated element of a commutated antenna array and $y_R$ is a sample of the observed signal received by a commutated element of the antenna array;

$a(y_C, y_R)_{AOA} = \arg\max_{\underline{\Phi}} \text{Color}^* U (U^* \text{diag}(\text{Energy}) U)^{-1} U^* \text{Color}$ where $U_n = \underline{u}_{k_n}(\underline{\Phi})$ $\text{Color}_n = <y_C, y_R>_{R_n}$ $\text{Energy}_n = <y_R, y_R>_{R_n}$ \quad (ii)

$y_C$ is a sample of the observed signal received by a commutated element of a commutated antenna array and $y_R$ is a sample of the observed signal received by a commutated element of the antenna array;

$$a(y, k)_{Sinusoids} = \frac{\|Y(k)w\|^2}{\|y(k) - Y(k)w\|^2} \quad (iii)$$

where $w = (Y(k) * Y(k))^{-1} Y(k) * y(k)$ and k is the k in k-means;

$$a(y,k)_{PSK\ k\text{-}ary\ 1} = a(y^k,k)\text{Sinusoids}, \quad (iv)$$

and k is the k in k-means;

$$a(y,k)_{PSK\ k\text{-}ary2} = \frac{\sum_i \text{Mean}(C_i)^2}{\sum_i \text{Variance}(C_i)} \quad (v)$$

where $$\{C_i\} = k - \text{means}(\Delta y)$$

and k is the k in k-means;

$$a(y,k)_{PSK\ k\text{-}ary3} = \max_{T \in \left[\frac{1}{2\Delta f}, \frac{2}{\Delta f}\right]} \frac{\sum_i \text{Mean}(C_i)^2}{\sum_i \text{Variance}(C_i)} \quad (vi)$$

where $$\{C_i\} = k - \text{means}\left(\bigcup_i s'_i\right),$$

and k is the k in k-means;

$$a(y,k)_{QAM\ k\text{-}ary1} = \frac{\sum_i \text{Mean}(C_i)^2}{\sum_i \text{Variance}(C_i)} \quad (vii)$$

where $$\{C_i\} = k - \text{means}(y^2)$$

and k is the k in k-means;

$$a(y,k)_{QAM\ k\text{-}ary2} = \max_{T \in \left[\frac{1}{2\Delta f}, \frac{2}{\Delta f}\right]} \frac{\sum_i \text{Mean}(C_i)^2}{\sum_i \text{Variance}(C_i)} \quad (viii)$$

where $$\{C_i\} = k - \text{means}\left(\bigcup_i s'_i\right)$$

k is the k in k-means, f is the frequency of the signal, and U denotes a union operator;

$$a(y)_{AM} = \frac{|\langle V(\tilde{\omega}_c, y, \omega), V(\tilde{\omega}_c, y, -\omega)\rangle|^2}{\|V(\tilde{\omega}_c, y, \omega)\|^2 \|V(\tilde{\omega}_c, y, -\omega)\|^2 - |\langle V(\tilde{\omega}_c, y, \omega), V(\tilde{\omega}_c, y, -\omega)\rangle|^2} \quad (ix)$$

$$\tilde{\omega}_c = \text{argmax}_{\omega_e} |\langle V(\omega_c, y, \omega), V(\omega_c, y, -\omega)\rangle|^2$$

and ω is frequency.

7. A method according to claim 6, wherein the attribute functions $a_1(y), a_2(y), \ldots$ are presented for computation of LLR(y) in an order that is in accordance with the time cost of observing the attributes.

8. A method according to claim 6, wherein the attribute functions $a_1(y), a_2(y), \ldots$ are presented for computation of LLR(y) in an order that is in accordance with the time cost of computation.

9. A method according to claim 6, wherein the attribute functions $a_1(y), a_2(y), \ldots$ are presented for computation of LLR(y) in an order that is in accordance with the time cost of communicating the observed attribute.

10. A non-transitory computer readable storage medium for use with a computer in a system for deciding whether an observed received signal is a particular signal of interest (SOI), wherein the computer readable storage medium contains computer executable program instructions for causing the computer to perform the step of:

(a) processing the observed received signal in accordance with a decision rule that uses a statistical model of the particular signal of interest and a statistical model of the environment when the particular signal of interest is not present to decide whether the observed received signal is the particular signal of interest;

wherein the decision rule is:

$$\text{decision} = \begin{cases} SOI & \text{if } LLR(y) > +\lambda \\ \sim SOI & \text{if } LLR(y) < -\lambda \\ \text{unsure} & \text{otherwise} \end{cases}$$

where $$LLR(y) = \log \frac{P(a_1(y), a_2(y), \ldots | SOI)}{P(a_1(y), a_2(y), \ldots | \sim SOI)},$$

where LLR is log likelihood ratio, P denotes a probability, $a_1(y)$ and $a_2(y)$ are functions of first and second attributes of the observed signal y in a sequential order that said attribute functions are presented for computation of LLR(y), and +λ and −λ are real numbers, wherein the statistical model of the particular signal of interest includes functions of attributes that individually have a probability distribution function $f_1$ when the observed received signal is the particular signal of interest such that $$KL(f_1, f_0) > 0,$$

where $f_0$ a is a probability distribution function of the respective individual attribute when the observed received signal is not a signal of interest;

wherein at least one of the attribute functions is expressed as one of the following:

$$a(y_C, y_R)_{\frac{S}{N}} = \frac{|\langle y_C, y_R\rangle|^2}{\|y_C\|^2 \|y_R\|^2 - |\langle y_C, y_R\rangle|^2}, \quad (i)$$

where $y_C$ is a sample of the observed signal received by a commutated element of a commutated antenna array and $y_R$ is a sample of the observed signal, received by a commutated element of the antenna array;

$$a(y_C, y_R)_{AOA} = \text{arg max}_{\Phi} \text{Color}^* U(U^* \text{diag}(\text{Energy})U)^{-1} U^* \text{Color}$$

where $$U_n = \underline{u}_{k_n}(\underline{\Phi})$$

$$\text{Color}_n = \langle y_C, y_R \rangle_{R_n}$$

$$\text{Energy}_n = \langle y_R, y_R \rangle_{R_n} \quad (ii)$$

$y_C$ is a sample of the observed signal received by a commutated element of a commutated ated antenna array and $y_R$ is a sample of the observed signal received by a commutated element of the antenna array;

$$a(y, k)_{Sinusoids} = \frac{\|Y(k)w\|^2}{\|y(k) - Y(k)w\|^2} \quad \text{(iii)}$$

where $$w = (Y(k) * Y(k))^{-1} Y(k) * y(k)$$

and k is the k in k-means;

$$a(y,k)_{PSK\,k\text{-}ary\,1} = a(y^k, k)Sinusoids, \quad \text{(iv)}$$

and k is the k in k-means;

$$a(y, k)_{PSK\,k\text{-}ary2} = \frac{\sum_i \text{Mean}(C_i)^2}{\sum_i \text{Variance}(C_i)} \quad \text{(v)}$$

where $$\{C_i\} = k - \text{means}(\Delta y)$$

and k is the k in k-means;

$$a(y, k)_{PSK\,k\text{-}ary3} = \max_{T \in \left[\frac{1}{2\Delta f}, \frac{2}{\Delta f}\right]} \frac{\sum_i \text{Mean}(C_i)^2}{\sum_i \text{Variance}(C_i)} \quad \text{(vi)}$$

where $$\{C_i\} = k - \text{means}\left(\bigcup_i s_i'\right),$$

and k is the k in k-means;

$$a(y, k)_{QAM\,k\text{-}ary1} = \frac{\sum_i \text{Mean}(C_i)^2}{\sum_i \text{Variance}(C_i)} \quad \text{(vii)}$$

where $$\{C_i\} = k - \text{means}(y^2)$$

and k is the k in k-means;

$$a(y, k)_{QAM\,k\text{-}ary2} = \max_{T \in \left[\frac{1}{2\Delta f}, \frac{2}{\Delta f}\right]} \frac{\sum_i \text{Mean}(C_i)^2}{\sum_i \text{Variance}(C_i)} \quad \text{(viii)}$$

where $$\{C_i\} = k - \text{means}\left(\bigcup_i s_i'\right)$$

k is the k in k-means, f is the frequency of the signal, and U denotes a union operator;

$$a(y)_{AM} = \frac{|\langle V(\tilde{\omega}_c, y, \omega), V(\tilde{\omega}_c, y, -\omega)\rangle|^2}{\|V(\tilde{\omega}_c, y, \omega)\|^2 \|V(\tilde{\omega}_c, y, -\omega)\|^2 - |\langle V(\tilde{\omega}_c, y, \omega), V(\tilde{\omega}_c, y, -\omega)\rangle|^2} \quad \text{(ix)}$$

$$\tilde{\omega}_c = \text{argmax}_{\omega_e} |\langle V(\omega_c, y, \omega), V(\omega_c, y, -\omega)\rangle|^2$$

and ω is frequency.

* * * * *

UNITED STATES PATENT AND TRADEMARK OFFICE
CERTIFICATE OF CORRECTION

PATENT NO.         : 8,572,010 B1
APPLICATION NO.    : 13/221397
DATED              : October 29, 2013
INVENTOR(S)        : James Covosso Francis It is certified that error appears in the above-identified patent and that said Letters Patent is hereby corrected as shown below:

In the Specification
    Column 2, lines 31-32, after "$U)$", "-1" should be shown as a superscript
    Column 2, lines 31-39, each occurrence of the terms "Color" and "Energy" should be underlined
    Column 2, line 50, each occurrence of "*" should be shown as a superscript
    Column 3, line 6, each occurrence of "$\Delta$" should have a "~" above it
    Column 3, line 28, each occurrence of "$\Delta$" should have a "~" above it
    Column 11, lines 38-46, each occurrence of the terms "Color" and "Energy" should be underlined
    Column 12, line 39, "$\omega_1 = e^{107}$" should be -- $\omega_1 = e^{i\omega}$ --
    Column 12, line 62, each occurrence of "*" should be shown as a superscript
    Column 16, line 18, "$s_{30}$" should be -- $s_+$ --
    Column 16, line 22, after "$\Im(u,$" insert line 23 beginning with --$\omega)\Im(u, -\omega)$. --

In the Claims
    Column 16, line 25, Claim 6, "$\Im(e^{-\omega cn} y_n, \omega)$" should be -- $\Im(e^{-i\omega cn} y_n, \omega)$ --
    Column 20, lines 45-53, Claim 6, each occurrence of the terms "Color" and "Energy" should be underlined
    Column 20, line 64, Claim 6, each occurrence of "*" should be shown as a superscript
    Column 21, line 42, Claim 6, each occurrence of "$\Delta$" should have a "~" above it
    Column 21, line 56, Claim 6, "$\mathrm{argmax}_{\omega e}$" should be -- $\mathrm{argmax}_{\omega c}$ --
    Column 22, lines 56-65, Claim 10, each occurrence of the terms "Color" and "Energy" should be underlined
    Column 23, line 8, Claim 10, each occurrence of "*" should be shown as a superscript
    Column 23, line 30, Claim 10, each occurrence of "$\Delta$" should have a "~" above it
    Column 24, line 17, Claim 10, each occurrence of "$\Delta$" should have a "~" above it
    Column 24, line 32, Claim 10, "$\mathrm{argmax}_{\omega e}$" should be -- $\mathrm{argmax}_{\omega c}$ --

Signed and Sealed this
Fifth Day of August, 2014

Michelle K. Lee
*Deputy Director of the United States Patent and Trademark Office*